(12) United States Patent
Foote et al.

(10) Patent No.: US 7,716,133 B1
(45) Date of Patent: May 11, 2010

(54) SELF SERVICE TERMINAL

(75) Inventors: Douglas S. Foote, Dayton, OH (US); Rory W. MacLeod, Glenfarg (GB)

(73) Assignee: NCR Corporation, Duluth, GA (US)

( * ) Notice: Subject to any disclaimer, the term of this patent is extended or adjusted under 35 U.S.C. 154(b) by 717 days.

(21) Appl. No.: 09/522,085

(22) Filed: Mar. 10, 2000

(51) Int. Cl.
*G06Q 40/00* (2006.01)

(52) U.S. Cl. .......................................... 705/43; 705/44

(58) Field of Classification Search ............. 705/10–45; 235/379–382
See application file for complete search history.

(56) References Cited

U.S. PATENT DOCUMENTS

| | | | |
|---|---|---|---|
| 5,915,023 A | | 6/1999 | Bernstein |
| 5,917,913 A | * | 6/1999 | Wang .......................... 235/380 |
| 5,940,811 A | * | 8/1999 | Norris .......................... 705/38 |
| 5,991,749 A | * | 11/1999 | Morrill, Jr. .................... 705/44 |
| 6,012,048 A | * | 1/2000 | Gustin et al. ................... 705/39 |
| 6,016,476 A | | 1/2000 | Maes et al. |
| 6,061,790 A | * | 5/2000 | Bodnar ........................ 380/282 |
| 6,175,922 B1 | * | 1/2001 | Wang .......................... 380/255 |
| 6,390,151 B1 | * | 5/2002 | Christman et al. ........... 141/231 |
| 6,431,439 B1 | * | 8/2002 | Suer et al. .................... 235/380 |
| 6,434,403 B1 | * | 8/2002 | Ausems et al. ............. 455/556.2 |
| 6,597,671 B1 | * | 7/2003 | Ahmadi et al. ............... 370/329 |
| 2001/0014881 A1 | * | 8/2001 | Drummond et al. ........... 705/43 |
| 2001/0045457 A1 | * | 11/2001 | Terranova et al. ........... 235/381 |
| 2001/0051922 A1 | * | 12/2001 | Waller et al. .................. 705/43 |
| 2002/0023215 A1 | * | 2/2002 | Wang et al. .................. 713/171 |
| 2002/0065775 A1 | * | 5/2002 | Monaghan .................... 705/43 |
| 2002/0188575 A1 | * | 12/2002 | Freeny, Jr. .................... 705/72 |

FOREIGN PATENT DOCUMENTS

| | | |
|---|---|---|
| EP | 0 933 733 A2 | 8/1999 |
| EP | 1 134 705 A2 | 9/2001 |
| WO | WO 98/11519 | 3/1998 |

OTHER PUBLICATIONS

"TV wireless remote Technology", MIT Lemelson Program 'Inventor of the week' Robert Adler, Massachusetts Institute of Technology MIT School of Engineering, http://web.mit.edu/invent/index.html.*
Patent Abstracts of Japan, vol. 1998, No. 11, Sep. 30, 1998 & JP 10 149400 A (Hitacjhi LTD; Hitachi Asahi Electron:KK, Jun. 2, 1998.

* cited by examiner

*Primary Examiner*—Frantzy Poinvil
(74) *Attorney, Agent, or Firm*—Michael Chan, Esq.

(57) ABSTRACT

A method of upgrading a self-service terminal (SST), such as an ATM. An SST is first identified which has (1) a screen for displaying withdrawal options usable by a customer and (2) a touch input mechanism for receiving user commands. Then the SST is modified so that it can receive user commands from a wireless telephone. The modifications may include retrofitting the SST with a transceiver adapted to receive signals directly from a wireless telephone. Alternately, or additionally, the modifying step may include retrofitting the SST and/or a network system host with a program for enabling the SST to receive a transaction from a remote source.

12 Claims, 7 Drawing Sheets

SELF SERVICE TERMINAL

The present invention relates to improvements in or relating to a self-service terminal (SST). In particular, the invention relates to a method of modifying an SST, and a method of operating an SST; and more particularly to SSTs in the form of automated teller machines (ATMs).

ATMs are widely used for dispensing cash. Conventional ATMs provide a user interface that includes a plurality of user interface elements, such as a display and an encrypting keypad, located within a molded fascia.

There are a number of different ATM manufacturers, and each manufacturer produces a different style of ATM. In addition, each manufacturer generally has a range of ATM styles, depending on the level of functionality provided by the ATM. This gives rise to a plethora of different types of user interfaces. Users of an ATM may have to spend time familiarizing themselves with the layout of the ATM before they feel confident enough to use the ATM.

As ATMs are public access terminals, typically located in public areas, they involve some degree of security risk. For example, there is the possibility of fraud by a third party observing a user's PIN as it is entered. There is also the possibility of a third party viewing the balance in a user's account if this balance is presented on the ATMs display.

Environmental factors are also an issue in the use of such ATMs. For example, in inclement weather, it can be an annoyance to input information to a touch input mechanism, such as a touch screen or keypad, at a drive-up ATM. Some users also have an aversion to coming into contact with a cold, soiled, or germ laden touch input mechanism.

SUMMARY OF THE INVENTION

It is among the objects of an embodiment of the invention to obviate or mitigate one or more of the above disadvantages or other disadvantages associated with conventional ATMs.

According to a first aspect of the present invention there is provided a method comprising: identifying an ATM having a display for displaying options for withdrawing cash and a touch input mechanism for receiving user commands; and modifying the ATM to enable it to receive from a wireless user interface, such as a wireless telephone, user commands for dispensing cash.

By virtue of this aspect of the invention, an ATM may be modified so that a user can withdraw cash using a wireless telephone, such as a cellular telephone. Thus, a user is able to use the user interface associated with his/her telephone rather than the user interface provided by the ATM. This enables a user to use the same user interface (that of his/her telephone) regardless of the make or style of ATM that they are using. By allowing a user to use his/her wireless telephone, privacy is improved because a third party will have more difficulty in viewing information presented on the telephone's display than on the ATM's display. Furthermore, environmental issues can be greatly obviated by allowing a user to bypass, in whole or in part, the existing touch input mechanism.

It will be appreciated that the term "wireless telephone" is used herein to include any wireless communication device for facilitating telephone conversations, and is not restricted to a conventional cellular telephone.

The modifying step may include retrofitting the ATM with a transceiver adapted to receive signals directly from a wireless telephone. This has the advantage that an existing ATM may be upgraded using a simple, low cost transceiver to allow a user to use a wireless telephone to execute a transaction.

Alternatively, the modifying step may include retrofitting the ATM with a remote-transaction program for enabling the ATM to receive a transaction from a remote source. The remote source may be an authorization facility for authorizing transactions, a call center having a secure connection with the ATM, or such like. In operation, a user may dial an authorization facility using a wireless telephone and enter transaction details directly thereto. The authorization facility may then authorize the transaction and transmit the authorized transaction to the ATM. The remote-transaction program enables the ATM to receive the authorized transaction, and the authorized transaction is then executed by the ATM and valuable media (such as banknotes) are dispensed to the user.

The advantage of retrofitting an ATM with a remote-transaction program is that the only local modification required for the ATM is a software upgrade (the remote-transaction program): a hardware upgrade is not required. The software modification may be implemented remotely (by uploading or downloading) so that no on-site visit is required. The remote-transaction program may update or replace an existing program resident on the ATM.

Where a transceiver is used, the transceiver may be further adapted to transmit signals directly to the wireless telephone so that a user may communicate directly with the ATM via the transceiver and a wireless telephone.

The transceiver may be operable in two modes: in one mode the transmitted and received signals may implement a local wireless communication, such as Bluetooth (trade mark); whereas in another mode the transceiver may implement wireless telephony to transmit and receive signals, for example, via a cellular network.

In embodiments where the transceiver implements local wireless communication, the method may include the step of retrofitting the ATM with a port for communicating with the transceiver so that a user can align his/her wireless telephone with the port on the ATM. The port may be an IrDA (Infra-red Data Association) compatible port. In other embodiments, the transceiver may not require any external ATM port to implement local wireless communication.

In one embodiment, the ATM is connected to a transaction host via a network for communication therebetween, and the modifying step includes providing a connection between the host and the wireless telephone. The connection may be provided by the transceiver implementing wireless telephony to communicate with the host. Alternatively, the connection may be implemented through a land line having a secure connection to an ATM controller, so that the ATM controller can communicate information between the transceiver and the host.

In one form, the ATM is connected to a transaction host via a network for communication therebetween, and the modifying step includes: retrofitting the ATM with a transceiver adapted to receive signals directly from a wireless telephone; and providing a connection between the host and the wireless telephone.

According to a second aspect of the invention there is provided a method comprising: identifying an ATM having a display for displaying options for withdrawing cash and a touch input mechanism for receiving user commands; and modifying the ATM to enable it to receive from a wireless telephone user commands for dispensing cash without the use of the touch input mechanism.

According to a third aspect of the invention there is provided an ATM comprising: a touch input mechanism for receiving user commands; and a transceiver for receiving user commands from a wireless telephone; wherein the ATM is adapted to receive user commands for dispensing cash from each of the touch input mechanism, the wireless telephone, and both.

According to a fourth aspect of the invention there is provided a method of operating an ATM having a touch input mechanism for receiving user commands, the method comprising the step of dispensing cash from the ATM in response to user commands from a wireless telephone.

The user commands may be communicated from the wireless telephone using wireless telephony. Alternatively, the user commands may be communicated from the wireless telephone using a local wireless communication technique.

In one form, the dispensing step occurs without the receipt of user commands from the touch input mechanism.

According to a fifth aspect of the invention there is provided a method of operating an ATM having a touch input mechanism for receiving user commands comprising: placing a call from a wireless telephone to the ATM over a wide area communications network; and transmitting information from the wireless telephone to the ATM using both the wireless telephone and the touch input mechanism.

In one form, the method further comprises the steps of: dispensing cash from the ATM; and charging a service fee for dispensing the cash to the account of the owner of the telephone.

According to a sixth aspect of the invention there is provided a method comprising the steps of: identifying an SST having a display for displaying user options and a touch input mechanism for receiving user commands; and modifying the SST so that it receives user commands from a wireless telephone.

The commands may be received directly from a wireless telephone. Alternatively, the commands may be received indirectly, for example, via a call center. Where the commands are received indirectly, the commands received may be in the form of an entire transaction for execution by the terminal.

By virtue of this aspect of the invention a method of retrofitting existing SSTs is provided, thereby enabling existing SSTs to be upgraded for access by a wireless telephone retained by a user. This ensures that the user does not need to use a display or a keypad provided by the SST. The cellular telephone may be a conventional cellular telephone.

According to a seventh aspect of the invention there is provided a transceiver for installing in an SST during a retrofit operation of the SST, where the transceiver is operable to conduct wireless communication with a user of the SST, and the transceiver is adapted to convey transactions to the SST, so that when the transceiver is installed in an SST a user can execute a transaction on the SST using a wireless communication device.

The wireless communication may be implemented by a local wireless technology, such as Bluetooth (trade mark), an IrDA-compliant protocol, or such like. This has the advantage that the user must be located in the vicinity of the transceiver (and therefore in the vicinity of the terminal) to operate the terminal.

Alternatively or additionally, the transceiver may be accessible using wireless telephony. If the transceiver is accessible using wireless telephony, then prior to dispensing cash the ATM may request the user to press a certain key on the ATM's keypad or display to ensure that the user is located at the ATM that is to dispense the cash. If the key is not pressed then the transaction may be aborted and the user requested to ensure that they are located at the correct ATM.

Each SST may be provided with a unique identifier so that a user can enter this unique identifier to confirm that the user is at the terminal that is to dispense valuable media.

The SST may be an ATM, or a kiosk for dispensing valuable (non-cash) media, such as tickets, passes, or such like.

The transceiver may be located within a cash dispensing mechanism, or outside the cash dispensing mechanism but within the SST.

In one form, the wireless connection is a telephony connection.

According to an eighth aspect of the present invention there is provided a self-service terminal having been retrofitted to allow the terminal to execute transactions entered using a wireless telephone.

According to a ninth aspect of the present invention there is provided a self-service terminal having been retrofitted to receive a transaction from an authorized source external to the terminal.

The terminal may receive an authorized transaction so that the terminal can implement the authorized transaction without requiring any further authorization.

According to a tenth aspect of the present invention there is provided a self-service terminal including a program storage device, the device being upgraded to encode a program of instructions for monitoring an external source and for receiving a transaction from an authorized source via the external source.

According to an eleventh aspect of the present invention there is provided a method comprising identifying a system which includes a host and a plurality of ATMs interconnected by a network in which each ATM has a screen for displaying options for withdrawing cash and a touch input mechanism for receiving user commands, and modifying the system to enable at least one of the ATMs to receive from a wireless telephone user commands for dispensing cash.

In one form the modifying step includes upgrading a program residing on the host, on one or more of the ATMs, or both the host and ATMs.

It will now be appreciated that SSTs and networks of SSTs according to the present invention have a number of advantages. As each user carries his/her own user interface it is easier for each user to personalize his/her user interface. In addition, a user is able to use any interface they desire to communicate with a terminal. This means that a disabled person is able to use a user interface that is adapted for their specific disability, for example a blind person is able to use an audio interface, a deaf person is able to use a visual interface, and such like.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
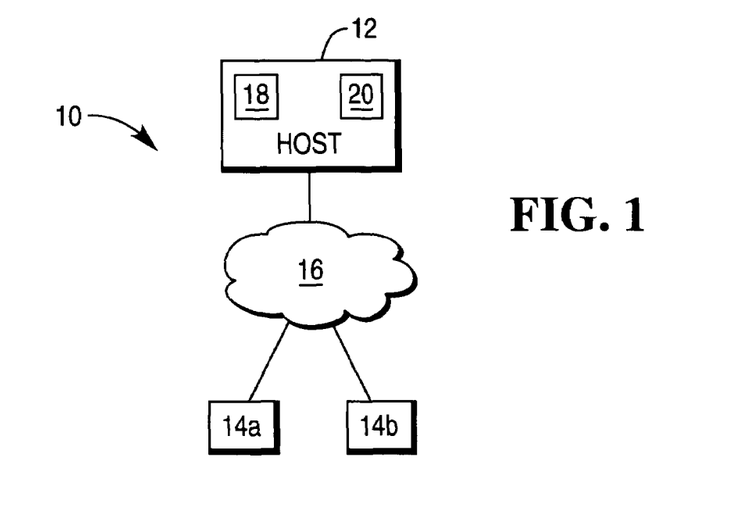
FIG. 1 is a block diagram of a conventional self-service terminal system.

Referring now to FIG. 1, which is a block diagram of a conventional self-service terminal system 10, the system 10 comprises a conventional host 12 interconnected to a plurality of SSTs 14 (only two, 14a and 14b, are shown) by a secure network 16. The SSTs 14 are ATMs. As is well known in the art, the host 12 includes an authorization facility 18 and a back-office facility 20. The ATMs 14 are physically remote from each other, but are shown in proximity in FIG. 1 for clarity.

Figure 2:
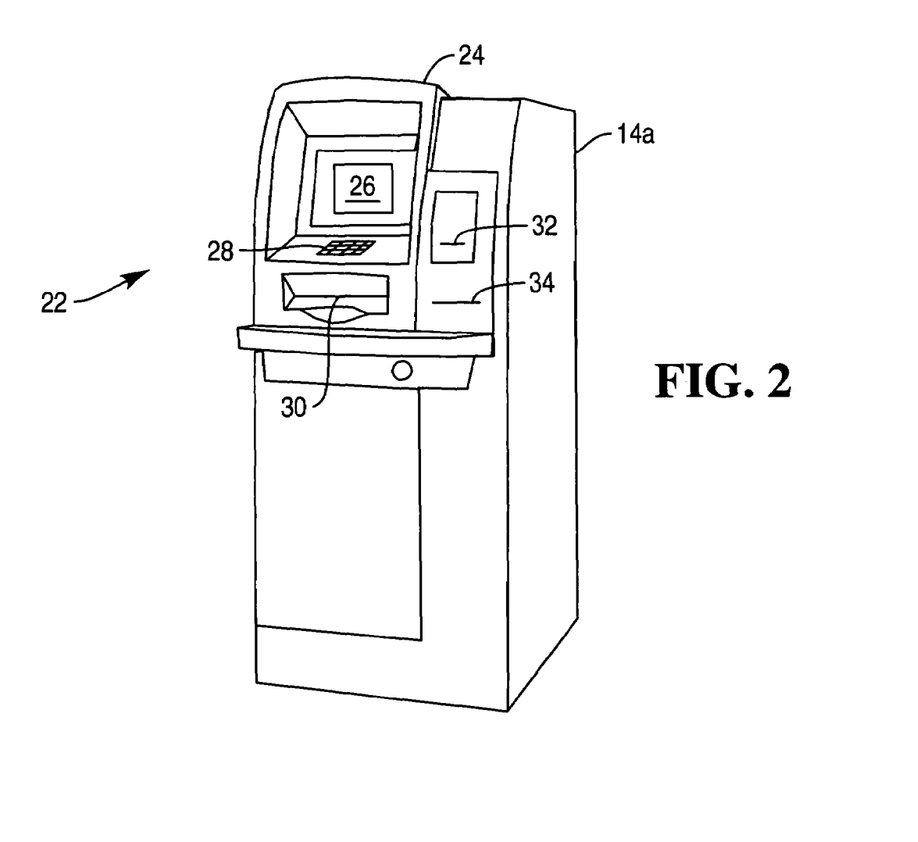
FIG. 2 is a perspective view of one of the terminals of FIG. 1.

Reference is now made to FIG. 2, which is a perspective view of one of the ATMs 14 of FIG. 1. Each ATM 14 has a user interface 22 located within a molded fascia 24. The user interface 22 comprises a display 26, an encrypting keypad 28, a cash dispense slot 30, a card entry/exit slot 32, and a receipt slot 34.

Figure 3:
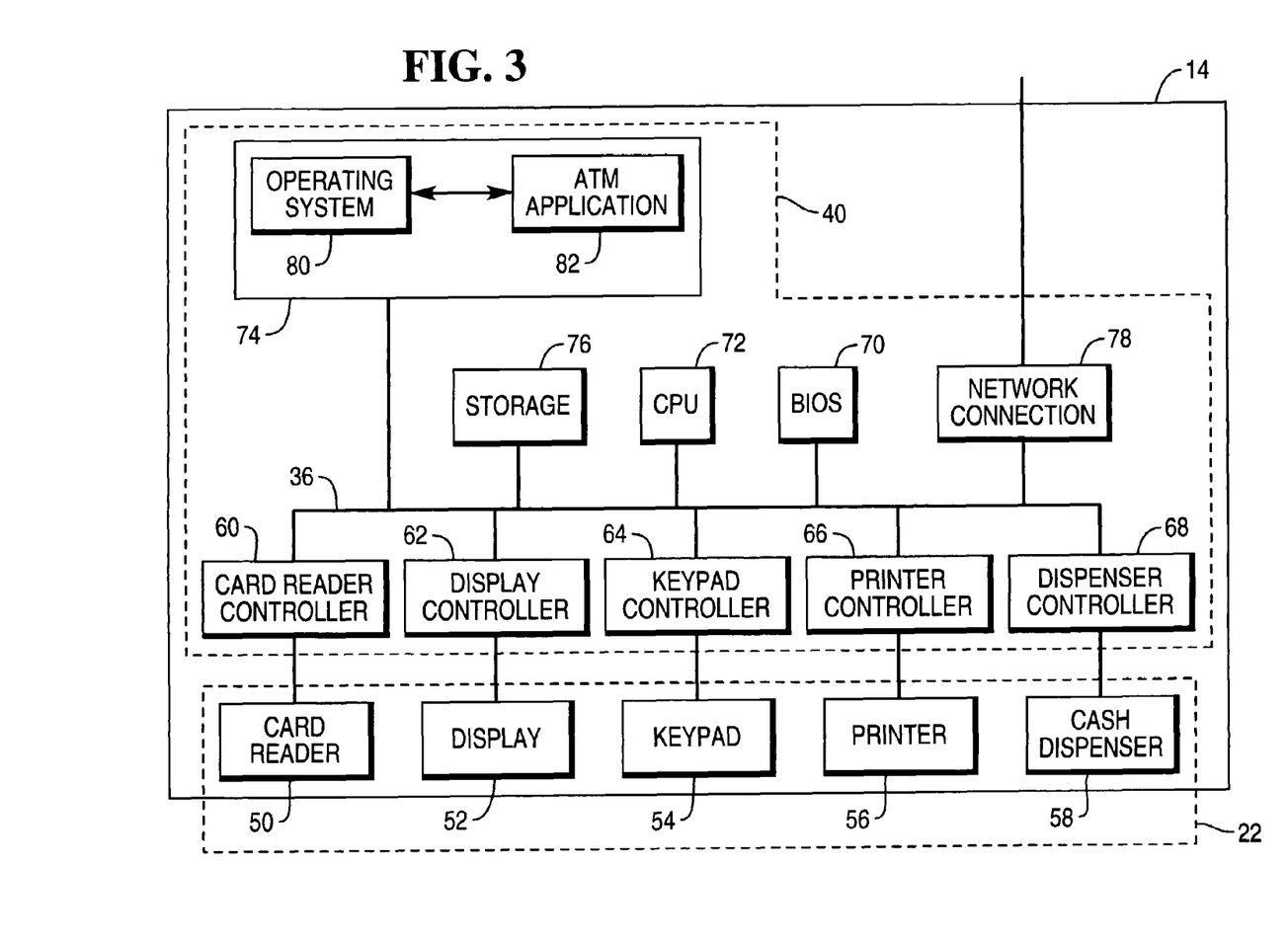
FIG. 3 is a block diagram of the architecture of the terminal of FIG. 2.

Reference is now made to FIG. 3, which is a simplified block diagram of the architecture of the terminal of FIG. 2. A system bus (or a plurality of system buses) 36 interconnects various modules in an ATM controller 40 to allow mutual intercommunication, as will be described in more detail below.

The user interface 22 comprises the following user interface elements (peripheral devices): a card reader 50, a display 52, an encrypting keypad module 54, a printer 56, and a cash dispenser 58.

The controller 40 comprises modules for driving the user interface elements 50 to 58, namely: card reader controller 60, display controller 62, keypad controller 64, printer controller 66, and dispenser controller 68. These user interface elements (50 to 58) and associated controllers (60 to 68) are standard modules that are used in conventional ATMs and will not be described in detail herein.

The controller 40 also comprises a BIOS 70 stored in non-volatile memory, a microprocessor 72, associated main memory 74, storage space 76 in the form of a magnetic disk drive, and a dedicated network connection 78 for connecting the ATM 14 to the transaction host 12 (FIG. 1) via the network 16.

In use, the main memory 74 is loaded with an ATM operating system kernel 80, and an ATM application 82 for controlling the operation of the ATM 14.

Figure 4:
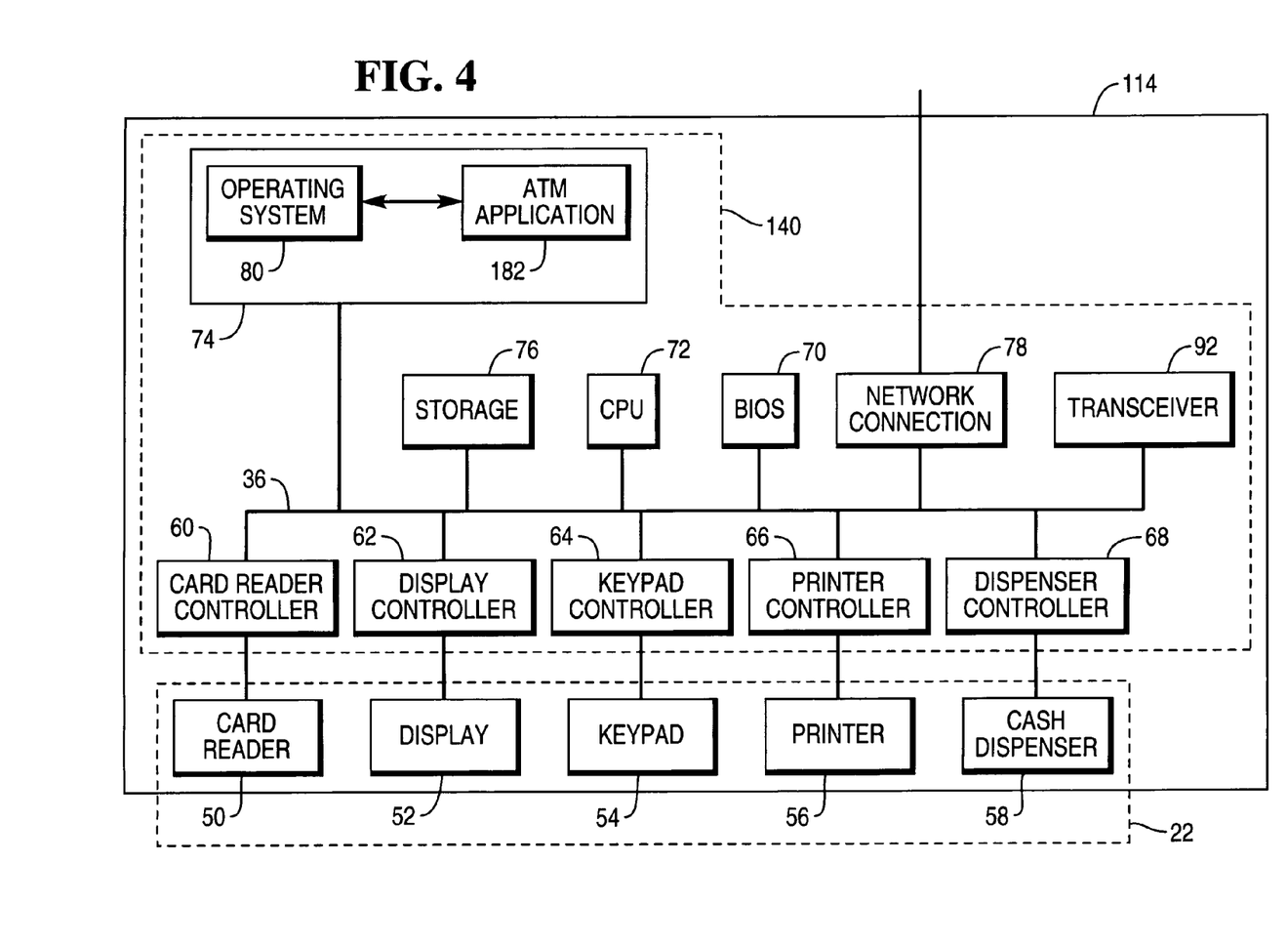
FIG. 4 is a block diagram of the architecture of a self-service terminal modified according to an embodiment of the present invention.

The ATM 14 of FIG. 2 may be modified in accordance with an embodiment of the present invention to produce modified ATM 114, as shown in FIG. 4. ATM 14 is modified to produce ATM 114 by:

(1) adding a single mode transceiver 92; and
(2) updating the controller 40 by loading a new ATM application 182.

The changes to the ATM 14 provide a new ATM 114 with a new controller 140 (differing from the previous controller 40 by a new ATM application 182 and the transceiver 92). In other respects, ATM 14 and ATM 114 are similar.

The single mode transceiver 92 is coupled to the system bus 36, thereby allowing the transceiver 92 to communicate with the microprocessor 72 (via bus 36). The transceiver 92 has a unique telephone number (which is typically printed on the front of the ATM 114) and is operable to transmit and receive signals to and from a cellular network and/or a landline connection.

The transceiver 92 may also include a text to speech processor, a speech to text processor, and an encryption/decryption facility (which may implement the RSA public key encryption, or the data encryption standard) so that information conveyed to and from the transceiver 92 can be encrypted for security purposes.

The new ATM application 182 allows the microprocessor 72 to send information to and receive information from the transceiver 92, thereby allowing the transceiver 92 to act as an ATM module.

Figures 5, 6, 12:
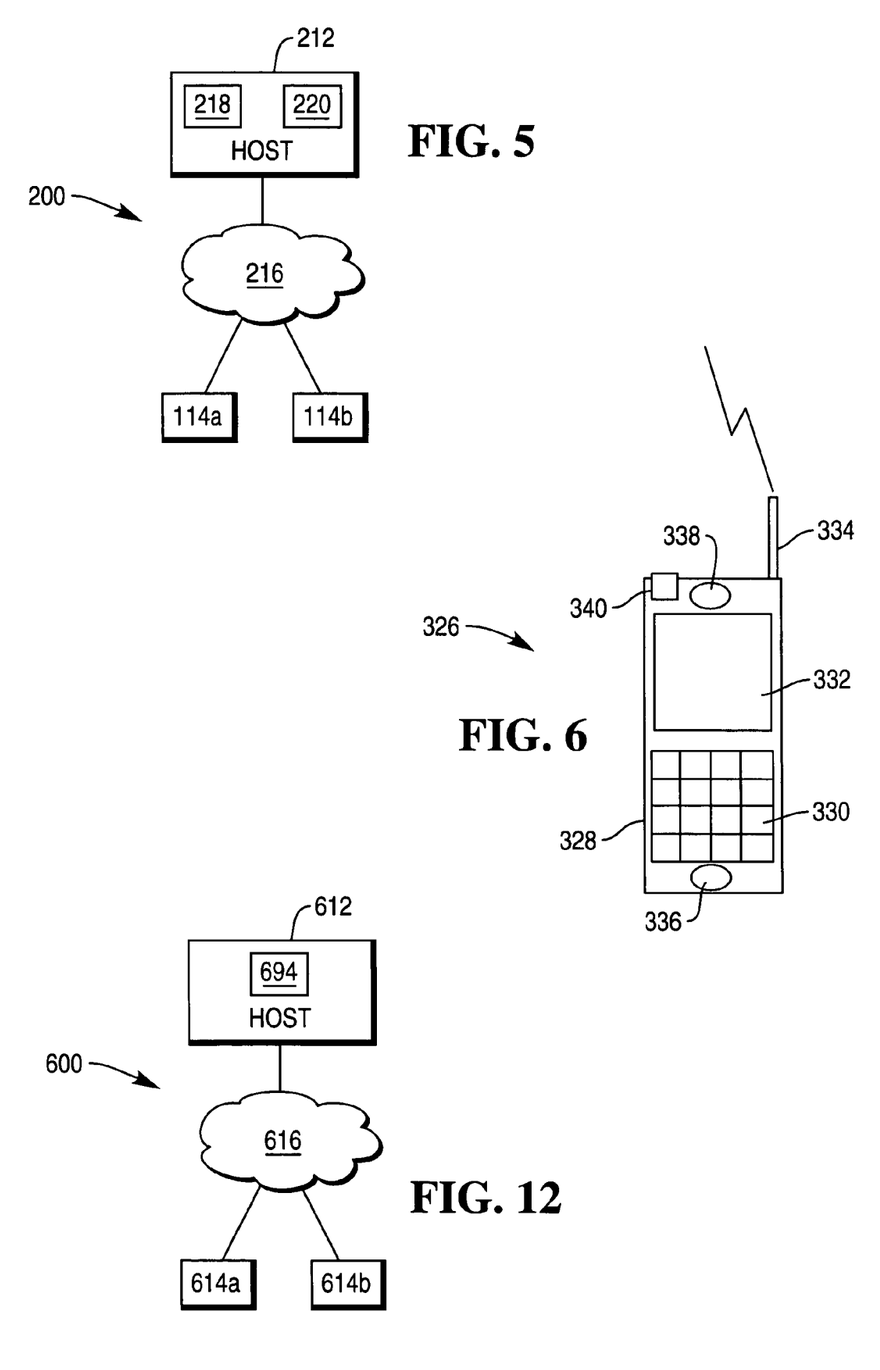
FIG. 5 is a block diagram of a self-service terminal system including the terminal of FIG. 4.
FIG. 6 is a pictorial front view of a wireless telephone for use with the system of FIG. 5.
FIG. 12 is a block diagram of a self-service terminal system according to another form of the invention.

Reference is now made to FIG. 5, which is a block diagram of a self-service terminal system 200 in accordance with an embodiment of the present invention. The system 200 is similar to system 10 (FIG. 1) and includes a host 212 interconnected to two ATMs 114 by a network 216. The host 212 includes an authorization facility 218 and a back-office facility 220.

An authorized user can use a wireless telephone, such as a GSM cellular telephone as shown in FIG. 6, to access the system 200. In this embodiment, the communication device 326 is a standard GSM cellular telephone (such as a NOKIA (trade mark) 7110 telephone) having a microbrowser for accessing Web pages. The phone 326 may use SSL and/or S-HTTP to provide a secure link for transferring highly confidential data, such as a user's PIN, over an Internet (TCP/IP) connection. Alternatively, cell phone 326 may include a dedicated encryption/decryption facility (not shown) for increasing the security of any transmission.

Cell phone 326 has a body 328 housing a keypad 330 for entering numbers and/or letters, a graphics display 332 for displaying graphical information, an antenna 334, a microphone 336, a loudspeaker 338, and an IrDA-compliant port 340. The cell phone 326 may also include a microbrowser (not shown) for receiving Web pages in WML format.

To withdraw cash from an ATM 114, an authorized user approaches the ATM 114 and dials the telephone number associated with the transceiver 92 (which is typically displayed on the ATM fascia 24). The user may have been issued with a password for identification purposes, or the transceiver 92 may use the telephone number or SIM (subscriber identity module) of the user's telephone to identify the user.

The transceiver 92 answers the call from the user and prompts the user to enter his/her password using a speech and/or text-based prompt. The text-based prompt is displayed on display 332 and the speech-based prompt is transmitted to the cell phone's loudspeaker 338.

Once a customer has entered his/her password (using keypad 330 or microphone 336), the telephone 326 encrypts and conveys it to the transceiver 92. Transceiver 92 performs any speech to text conversion required, decrypts the received password, and then sends an encrypted prompt to the customer's telephone 326, which, when decrypted, requests the customer to enter his/her PIN. The entered PIN is then encrypted and conveyed, and the transceiver 92 then requests the user to enter the amount of cash to be withdrawn.

Once the transceiver 92 has received the desired amount, the transceiver 92 conveys the transaction information (comprising the user's password, PIN and the desired amount) to the microprocessor 72 via bus 36. The microprocessor 72 (which executes the ATM application 182) conveys the transaction information to the authorization facility 218 for authorization.

On receipt of authorization, the microprocessor 72 informs the transceiver 92 of successful authorization, and the transceiver 92 conveys a message to the user's phone 326 advising the user that his/her cash is about to be dispensed. The microprocessor 72 instructs dispensing of the authorized amount of cash to the user.

Prior to authorizing the transaction, the transceiver 92 may advise the user (via cell phone 326) of a transaction charge that will be levied for the transaction, and may request the user to confirm that he/she still wishes to execute the transaction. If within a pre-set time, such as twenty seconds, the user does not confirm that he/she wishes the transaction to be executed then the transaction may be cancelled. If the user does confirm that he/she wishes to proceed with the transaction, then the ATM 114 applies a charge to an account held by the user. This may be a telecommunications account for the cellular telephone, or it may be a bank account.

For each transaction, the ATM 114 may credit a user's telecommunications account with free time, for example, one minute for each dollar that has been withdrawn.

In another embodiment, a wireless telephone having an integral identifier (such as a biometrics sensor in the form of a fingerprint sensor) may be used. In such an embodiment, the device may provide a special signal when the user of the device has been identified. This special signal may be used by a transceiver as confirmation of the user's identity, thereby avoiding the need for the user to enter a PIN.

Figure 7:
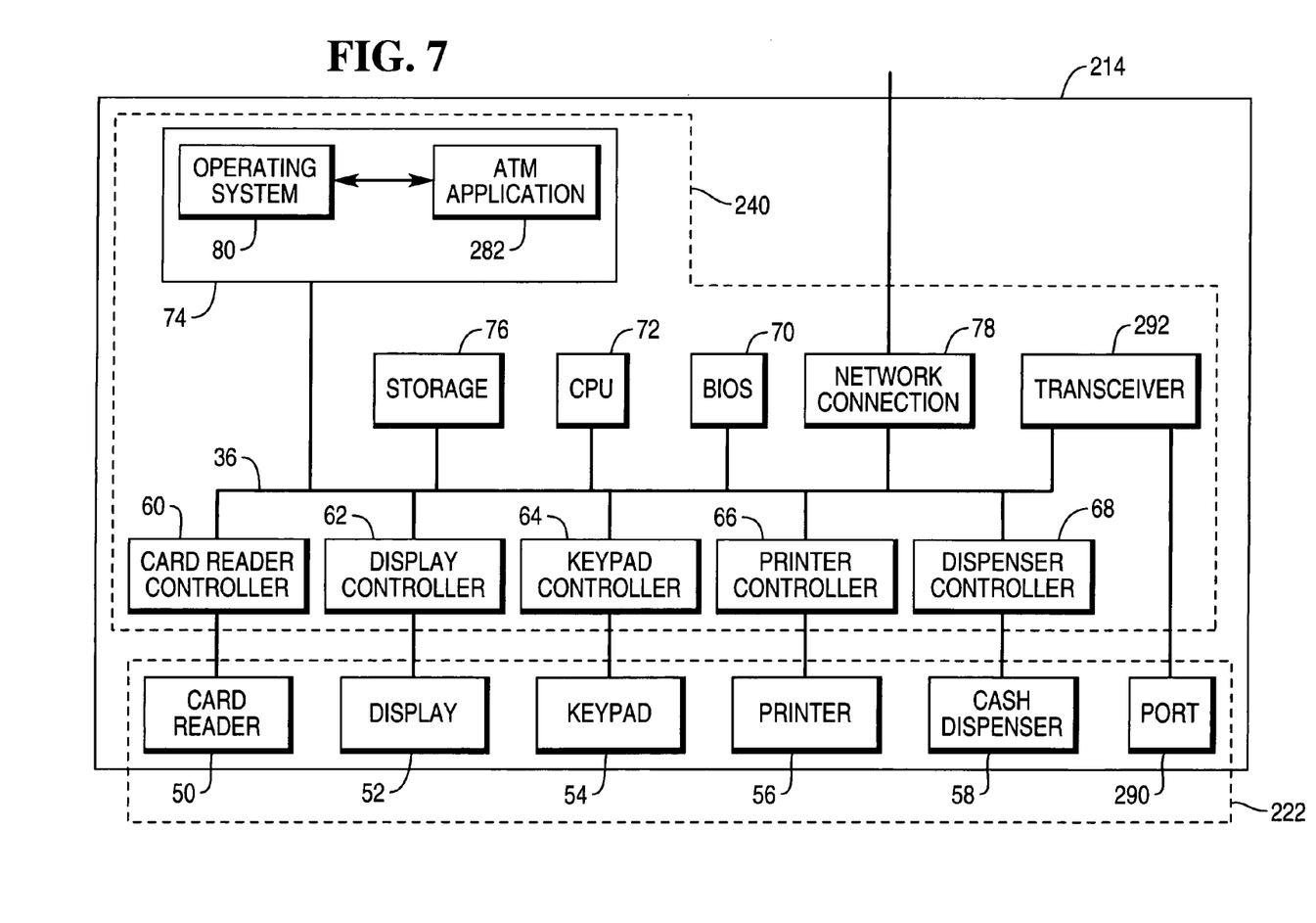
FIG. 7 is a block diagram of the architecture of a self-service terminal modified according to another embodiment of the present invention.
Figure 8:
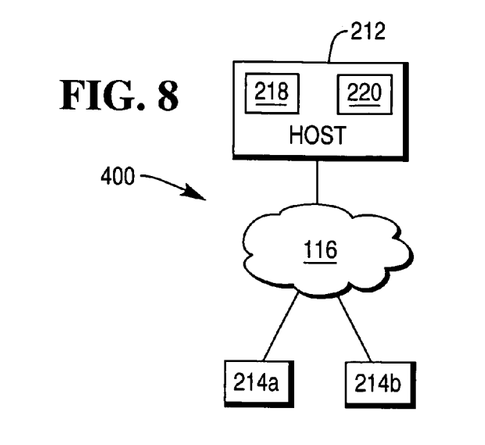
FIG. 8 is a block diagram of a self-service terminal system including the terminal of FIG. 7.

The ATM 14 of FIG. 2 may be modified in accordance with another embodiment of the present invention to produce modified ATM 214, as shown in FIG. 7, for use in an ATM system 400, as shown in FIG. 8.

ATM 14 is modified to produce ATM 214 by:

(1) adding an infra-red port 290 to the user interface 22 so that the port 290 protrudes through the existing fascia 24;

(2) adding a dual mode transceiver 292; and (3) updating the controller 40 by loading a new ATM application 282.

These changes to ATM 14 provide a new ATM 214 with a new fascia 222 (differing from the previous fascia 22 by the presence of the port 290), and a new controller 240 (differing from the previous controller 40 by a new ATM application 282 and the transceiver 292). In other respects, ATM 14 and ATM 214 are similar.

The port 290 is an IrDA-compliant module for receiving and transmitting information in infra-red format.

The dual mode transceiver 292 is coupled to the system bus 36, and the infra-red port 290 is coupled to the transceiver 292; thereby allowing the transceiver 292 to communicate with the microprocessor 72 (via bus 36) and a user (via port 290). The transceiver 292 has a unique telephone number (which is typically printed on the front of the ATM 214) and is operable to transmit and receive signals to and from a cellular network and/or a landline connection.

The transceiver 292 may also include a text to speech processor, a speech to text processor, and an encryption/decryption facility (which may implement the RSA public key encryption, or the data encryption standard) so that information conveyed to and from the transceiver 292 can be encrypted for security purposes.

The transceiver 292 can operate in a first mode using a local communication protocol such as Bluetooth (trade mark), or in a second mode using wireless telephony.

When wireless telephony is used, the transceiver 292 communicates via a cellular network (not shown) and the ATM 214 operates in the same manner as described with reference to the ATM 114 of FIG. 4.

An authorized user can use a wireless telephone (such as the GSM cellular telephone shown in FIG. 6), or any other wireless communication device having an IrDA-compliant port (such as a personal digital assistant), to access the ATM 214.

Reference is now made to FIGS. 6 to 9. To withdraw cash from ATM 214 using cell phone 326, a user 402 approaches the ATM 214 and executes a cell phone transaction program (not shown). This transaction program may be resident on the phone 326 or may be downloaded from a Web site using the phone's microbrowser. The cell phone transaction program provides the user 402 with a user interface for preparing a transaction, and also provides an encryption facility for encrypting the transaction.

Figure 9:
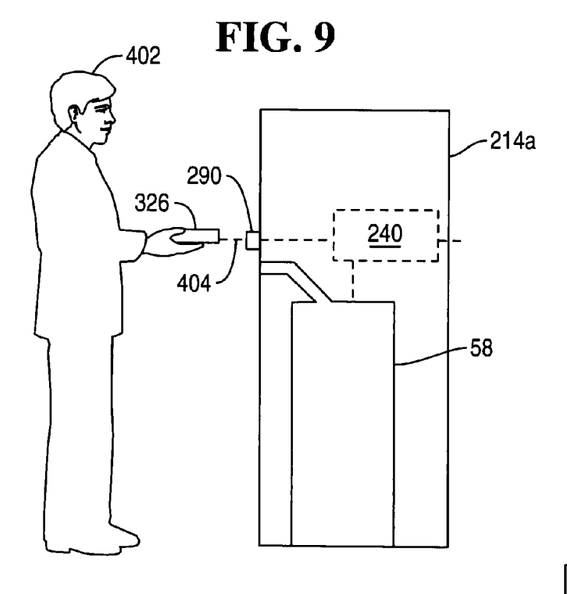
FIG. 9 is a schematic diagram illustrating a user operating the portable device of FIG. 6 in the vicinity of a terminal of FIG. 7.

The user 402 prepares a transaction using this cell phone program and executes the transaction by aligning the telephone's IrDA port 340 with the ATM's port 290 and transmitting the prepared transaction, as illustrated by broken line 404 in FIG. 9.

On receiving the encrypted prepared transaction, the IrDA port 290 conveys the transmission to the processor 72. The processor 72 decrypts the received transaction and sends the received PIN and transaction request to the host 212 (FIG. 8) for authorization. The processor 72 then conveys a message to the cell phone 326 informing the user 402 that the request is being authorized.

On receipt of authorization from the host 212, the processor 72 instructs the cash dispenser 58 to dispense the requested cash. The dispenser 58 dispenses the cash, and the processor 72 transmits a message to the phone 326 (via ports 290 and 340) indicating that the user's cash has been dispensed. The user 402 then removes the dispensed cash to complete the transaction.

If the transaction is not authorized or if the cash cannot be dispensed, then the processor 72 transmits a message to the phone 326 to inform the user 402 that the transaction cannot be executed. This provides the user 402 with feedback relating to the status and progress of the transaction being executed.

Figure 10:
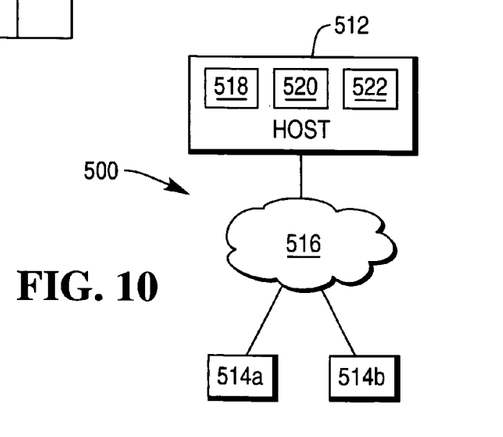
FIG. 10 is a block diagram of a self-service terminal system according to another embodiment of the invention.
Figure 11:
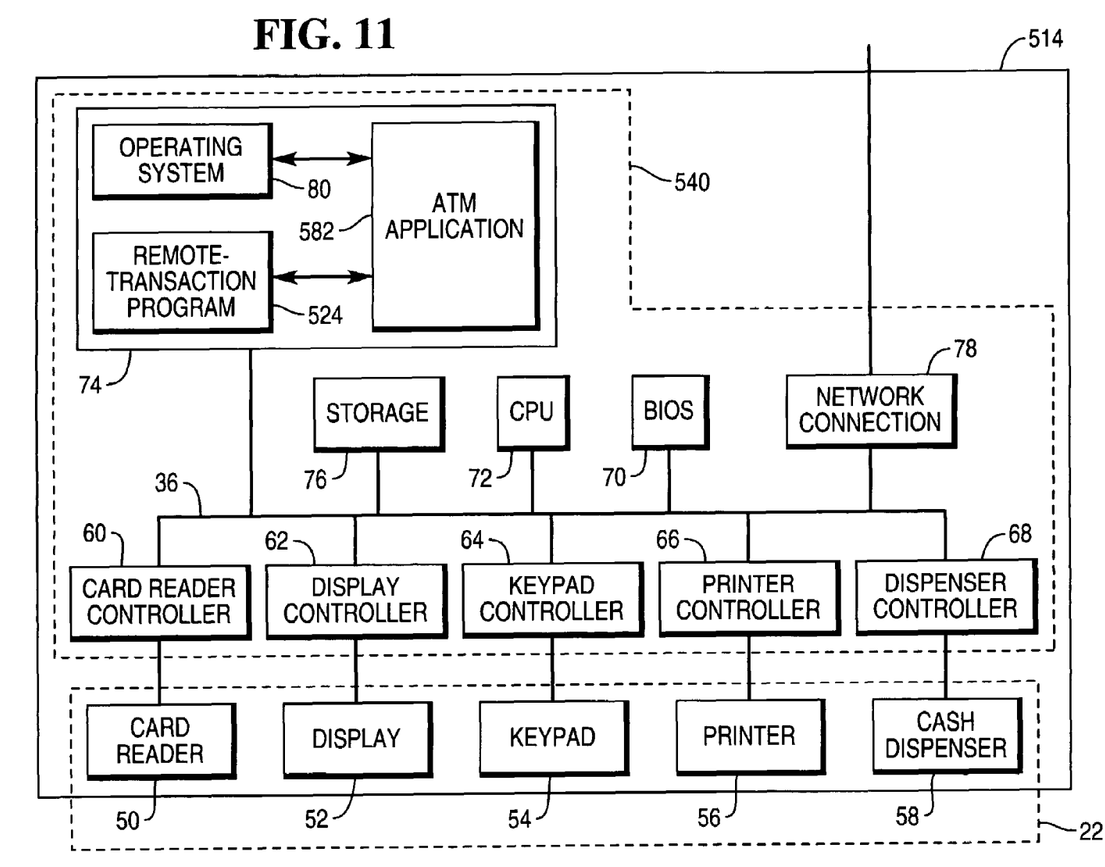
FIG. 11 is a block diagram of the architecture of a self-service terminal modified for the system of FIG. 10.

Reference is now made to FIGS. 10 and 11, which show yet another embodiment of the present invention. In FIG. 10 a system 500 is shown that is similar to system 10 (FIG. 1) and includes a host 512 interconnected to two ATMs 514a and 514b by a network 516. The host 512 includes an authorization facility 518, a back-office facility 520, and a call center 522, automated or otherwise. The call center 522 is operable to receive telephone calls directly from a wireless telephone so that a wireless telephone user can telephone the call center 522 to enter a transaction. The call center 522 is capable of receiving telephone calls for either ATM 514.

ATM 514a is a modified version of ATM 14a (FIG. 1). ATM 514a has a new controller 540 (differing from the previous controller 40 by a new ATM application 582 and a new remote-transaction program 524). In other respects, ATM 14a and ATM 514a are similar. In other embodiments the new ATM application 582 and the remote-transaction program 524 may be combined into a single program.

In use, the ATM 514 executes the transaction program 524. The program 524 monitors the network connection 78 to detect an incoming transaction from the host 512.

To use the ATM 514a, a customer approaches the ATM 514a and dials the call center 522 telephone number, which may be printed on the front of the ATM 514a. The call center 522 provides the user with a menu of transactions to allow the user to enter transaction details. The call center 522 then conveys this entered transaction to the authorization facility 518 to authorize the transaction.

When the transaction has been authorized the call center 522 conveys the authorized transaction to the ATM 514a. The remote-transaction program 524 detects the arrival of the authorized transaction and informs the ATM application 582. The ATM application 582 then executes the authorized transaction and dispenses any cash that has been requested in the transaction.

Reference is now made to FIG. 12, which shows yet another embodiment of the present invention. In FIG. 12 a system 600 is shown and includes a host 612 interconnected to two ATMs 614a and 614b by a network 616. The host 612 includes a software program 694. Each ATM 614 may also include an ATM application (not shown). System 600 may be modified by changing or upgrading the program 694 to enable at least one of the ATMs 614 to receive from a wireless telephone user commands for dispensing cash. Alternatively, the system 600 may be modified by upgrading the ATM application on the ATM(s) 614 to receive from a wireless telephone user commands for dispensing cash. In another variation, both program 694 and the ATM application(s) may be upgraded to receive from a wireless telephone user commands for dispensing cash.

Yet another embodiment of the present invention applies to an ATM which is connected to a host through either a private or public network for communication therebetween. In this embodiment, the system is adapted to allow communication to proceed between the user and the ATM through a wireless telephone network. In other words, a call would be placed by the user over his/her wireless telephone network, communication thereby being established with the host and signals transmitted therefrom to the ATM. In this embodiment, modifications may be made to the ATM application residing on the ATM, but no transceiver would be added to the ATM.

In another embodiment, a transceiver may be added as shown in FIG. 4, and communication may proceed over two paths—the cellular network as described in the preceding paragraph and the transceiver.

In an alternative form of operation of any of the embodiments described herein, the user may insert his/her card into a card reader to verify his/her presence at the ATM. Otherwise, communication will proceed through the user's wireless telephone.

Various modifications may be made to the above described embodiment within the scope of the invention, for example, the media dispensed may include stamps, telephone cards, ski passes, or such like. In other embodiments, a single mode transceiver that allows only local wireless communication may be used in the ATM, and a wireless telephony transceiver may be located in a call center remote from the ATM so that only local communication may occur at an ATM. In other embodiments, a user's account number and PIN (or an encrypted version thereof) may be stored in the user's SIM and may be transferred by the telephone only after the user has entered a release code, so that the account number and PIN cannot be read or overwritten unless a valid release code has been entered. The ATMs may be connected to the host via a public or a private network.

In another variation, the ATM Application may reside on the host and not within the ATM as described above.

In yet another variation, in certain circumstance it may be desirable to have the user make limited use of the touch input mechanism prior to dispensing media from the SST. For example, to verify his/her physical presence at the SST, or to enter other information in combination with the use of the wireless telephone.

What is claimed is:

1. A method comprising:
   a) in a group of automated transaction machines ATMs,
      i) all of which are located in public places,
      ii) all of which are connected to a financial network;
      iii) all of which are operable to dispense cash to customers in response to customer commands;
      iii) in which is contained a sub-group of ATMs in which the ATMs are not
         capable of dispensing cash in response to commands issued by
         a customer from a cellular telephone,
      identifying an automated transaction machine ATM in the sub-group; and
   b) modifying said identified ATM into a retro-fitted ATM which dispenses cash in response to commands received from a wireless telephone.

2. The method of claim 1 wherein said modifying step includes retrofitting said ATM with a program for enabling said ATM to receive a transaction from a remote source.

3. The method of claim 1 wherein said modifying step includes retrofitting said ATM with a transceiver adapted to receive signals directly from the wireless telephone.

4. The method of claim 3, wherein said transceiver is further adapted to transmit signals directly to said wireless telephone.

5. The method of claim 4 wherein said signals implement local wireless communication.

6. The method of claim 1 wherein said ATM is connected to a network for communication therebetween, and wherein said modifying step includes providing a connection between said network and said wireless telephone.

7. Method according to claim 6, wherein communication between the wireless telephone and the ATM occurs through the network.

8. The method of claim 1 wherein said modifying step includes: retrofitting said ATM with a transceiver adapted to receive signals directly from a wireless telephone; and providing a connection between said network and said wireless telephone.

9. Method according to claim 8, wherein said ATM was unable to receive signals directly from a wireless telephone prior to the modifying step.

10. Method according to claim 1, wherein, prior to the process of modifying said ATM, said ATM was incapable of receiving user commands for dispensing cash from a wireless telephone.

11. A method comprising: identifying an ATM which has a screen for displaying options for withdrawing cash and a touch input mechanism for receiving user commands; and modifying said ATM into a retro-fitted ATM to enable it to receive from a wireless telephone user commands for dispensing cash without the use of said touch input mechanism, wherein
   1) the ATM, prior to modification, is operative to (A) respond to user commands, including a command to dispense cash, and (B) cause a modification to the user's account, 2) the ATM, before and after modification, is connected to a host computer via a network,
3) before the modification, other ATMs are connected to the host computer via the network,
4) the other ATMs are operative to respond to user commands, including a command to dispense cash,
5) all said ATMs are located in public places, and
6) at least some of the other ATMs are not modified to enable them to receive from a wireless telephone user commands for dispensing cash.

12. Method according to claim 11, wherein said ATM was unable to receive signals directly from a wireless telephone prior to the modifying step.

* * * * *